(12) United States Patent
Summers et al.

(10) Patent No.: US 12,485,946 B2
(45) Date of Patent: Dec. 2, 2025

(54) SMART HANDLEBAR FOR UTILITY VEHICLES

(71) Applicant: GM GLOBAL TECHNOLOGY OPERATIONS LLC, Detroit, MI (US)

(72) Inventors: Noah Summers, Stouffville (CA); Jarvis Chau, Markham (CA); Matthew Manko, Bowmanville (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 422 days.

(21) Appl. No.: 18/100,109

(22) Filed: Jan. 23, 2023

(65) Prior Publication Data
US 2024/0246591 A1 Jul. 25, 2024

(51) Int. Cl.
| | |
|---|---|
| *B62B 5/00* | (2006.01) |
| *B62B 3/00* | (2006.01) |
| *B62B 5/06* | (2006.01) |
| *G01G 19/12* | (2006.01) |
| *G01L 1/22* | (2006.01) |

(52) U.S. Cl.
CPC ............ *B62B 5/0073* (2013.01); *B62B 3/002* (2013.01); *B62B 5/0033* (2013.01); *B62B 5/06* (2013.01); *G01G 19/12* (2013.01); *G01L 1/2262* (2013.01)

(58) Field of Classification Search
CPC ..... B62B 5/0073; B62B 3/002; B62B 5/0033; B62B 5/06; B62B 3/00; B62B 3/005; B62B 5/00; B62B 5/0069; B62B 5/061; G01G 19/12; G01G 19/086; G01L 1/2262; G01L 5/22
See application file for complete search history.

(56) References Cited

U.S. PATENT DOCUMENTS

| | | | |
|---|---|---|---|
| 7,316,165 B2 * | 1/2008 | Murakami | G01L 5/22 73/818 |
| 7,347,100 B2 * | 3/2008 | Murakami | G01L 5/22 414/4 |
| 7,789,187 B2 * | 9/2010 | Zerhusen | A61G 7/08 180/323 |
| 9,315,115 B2 * | 4/2016 | Katayama | B60L 15/10 |
| 9,650,061 B2 * | 5/2017 | Katayama | A61H 3/04 |
| 10,906,573 B2 * | 2/2021 | Chung | B62B 5/0073 |

(Continued)

FOREIGN PATENT DOCUMENTS

| | | | | |
|---|---|---|---|---|
| DE | 202020104319 U1 * | 10/2021 | | B62B 3/001 |
| EP | 3915856 A1 * | 12/2021 | | B62B 3/001 |

(Continued)

*Primary Examiner* — James A Shriver, II
*Assistant Examiner* — Ian Bryce Shelton (57) ABSTRACT

A utility vehicle including a housing configured for storing goods therein during transport. A handlebar extends into a chassis sleeve defined by a chassis. The handlebar is slidably moveable forward and backward within the chassis sleeve. A sensor includes a flexible member having a first end mounted to the chassis sleeve and a second end mounted to the handlebar. The sensor is configured to sense a magnitude and a direction of a force exerted on the handlebar by an operator. A control module is in communication with the sensor and a motor. The control module is configured to control motor speed and motor direction of the motor based on the magnitude and the direction of the force exerted on the handlebar by the operator as sensed by the sensor.

19 Claims, 10 Drawing Sheets

(56) References Cited

U.S. PATENT DOCUMENTS

| | | | | |
|---|---|---|---|---|
| 11,294,415 B2* | 4/2022 | Schmidt | | A61G 5/1051 |
| 11,511,785 B2* | 11/2022 | Kim | | B62B 5/06 |
| 11,618,492 B2* | 4/2023 | Sa | | B62B 5/06 |
| | | | | 180/19.3 |
| 11,702,122 B2* | 7/2023 | Raja | | A61H 1/00 |
| | | | | 180/65.8 |
| 2006/0243058 A1* | 11/2006 | Murakami | | B62B 5/0026 |
| | | | | 73/818 |
| 2006/0272406 A1* | 12/2006 | Murakami | | G01L 5/22 |
| | | | | 73/379.01 |
| 2009/0188731 A1* | 7/2009 | Zerhusen | | A61G 1/0237 |
| | | | | 180/19.3 |
| 2014/0345956 A1* | 11/2014 | Kojina | | B62B 5/0073 |
| | | | | 180/19.1 |
| 2014/0358344 A1* | 12/2014 | Katayama | | B62B 5/0073 |
| | | | | 701/22 |
| 2015/0060175 A1* | 3/2015 | Katayama | | B60L 3/104 |
| | | | | 180/197 |
| 2015/0066274 A1* | 3/2015 | Hijikata | | A61G 5/04 |
| | | | | 180/19.1 |
| 2015/0066277 A1* | 3/2015 | Kojina | | A61H 3/04 |
| | | | | 180/19.1 |
| 2017/0001656 A1* | 1/2017 | Katayama | | A61H 3/04 |
| 2018/0118245 A1* | 5/2018 | Chung | | B62B 5/0043 |
| 2018/0229748 A1* | 8/2018 | Nakamura | | B62B 5/004 |
| 2018/0244294 A1* | 8/2018 | Ochiai | | B62B 5/004 |
| 2020/0346679 A1* | 11/2020 | Kim | | B62B 5/004 |
| 2020/0393866 A1* | 12/2020 | Schmidt | | A61G 5/1051 |
| 2021/0155278 A1* | 5/2021 | Raja | | A61H 3/04 |
| 2021/0229722 A1* | 7/2021 | Sa | | B62B 5/0046 |
| 2021/0229729 A1* | 7/2021 | Lee | | B62B 3/001 |
| 2022/0388560 A1* | 12/2022 | Niwa | | A61G 7/08 |

FOREIGN PATENT DOCUMENTS

| | | | | |
|---|---|---|---|---|
| JP | 2006322839 A | * | 11/2006 | G01L 5/22 |
| KR | 20180067467 A | * | 6/2018 | |
| KR | 20190113394 A | * | 10/2019 | |
| WO | WO-2019068405 A1 | * | 4/2019 | B62B 3/001 |

* cited by examiner

SMART HANDLEBAR FOR UTILITY VEHICLES

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to a utility vehicle including a handlebar configured for use in operating the vehicle.

Utility vehicles, such as delivery carts, may be propelled with electric motors. An operator stands adjacent to the cart and inputs operational commands for the motor, including direction and speed. The operator then walks along with the cart to a delivery or pickup destination.

SUMMARY

In a feature, the present disclosure includes a utility vehicle configured for transporting goods. The utility vehicle has a chassis and wheels mounted to the chassis. A housing is mounted to the chassis. The housing is configured for storing the goods therein during transport. A motor is configured to drive the wheels. A handlebar extends into a chassis sleeve defined by the chassis. The handlebar is slidably moveable forward and backward within the chassis sleeve. A sensor includes a flexible member having a first end mounted to the chassis sleeve and a second end mounted to the handlebar. The sensor is configured to sense a magnitude and a direction of a force exerted on the handlebar by an operator. A control module is in communication with the sensor and the motor. The control module is configured to control motor speed and motor direction of the motor based on the magnitude and the direction of the force exerted on the handlebar by the operator as sensed by the sensor.

In other features, the flexible member is a deflection beam extending along an axial center of the handlebar.

In other features, the first end of the flexible member is fastened to a chassis stand-off mount within the chassis sleeve, and the second end of the flexible member is fastened to a handlebar standoff mount within the handlebar.

In other features, a first strain gauge is proximate to the first end and a second strain gauge proximate to the second end.

In other features, the flexible member further includes a third strain gauge proximate to the first end and a fourth strain gauge proximate to the second end. The first strain gauge, the second strain gauge, the third strain gauge, and the fourth strain gauge are connected in a Wheatstone bridge circuit.

In other features, at an interface between the handlebar and the chassis sleeve, one of the chassis sleeve and the handlebar is oval in cross-section, and the other of the chassis sleeve and the handlebar is circular in cross-section.

In other features, cooperation between the handlebar and the chassis sleeve at the interface permits horizontal movement of the handlebar forward and backward, and restricts vertical movement of the handlebar upward and downward relative to the chassis sleeve.

In other features, at the interface between the handlebar and the chassis sleeve, the handlebar is round in cross-section and the chassis sleeve is oval in cross-section. The handlebar directly abuts the chassis sleeve at a top and a bottom of the interface to restrict vertical movement of the handlebar upward and downward. A front gap is defined between the handlebar and the chassis sleeve at a front of the interface, and a rear gap is defined between the handlebar and the chassis sleeve at a rear of the interface, to permit horizontal movement of the handlebar forward and backward.

In other features, the handlebar includes an enabling switch configured to sense physical contact with the operator, the enabling switch is in cooperation with the control module. The control module is configured restrict operation of the motor without physical contact with the operator sensed by the enabling switch.

In other features, a velocity sensor is configured to measure velocity of the utility vehicle. The velocity sensor is in cooperation with the control module. The control module is configured to: measure acceleration of the utility vehicle based on the velocity measured by the velocity sensor; identify a loaded mass of the utility vehicle based on the measured acceleration and the magnitude of the force exerted on the handlebar as sensed by the sensor; identify a payload mass of a payload of the utility vehicle equal to a difference between the loaded mass and an unloaded mass of the utility vehicle; and generate an alert to the operator when the payload mass exceeds a predetermined threshold.

In a feature, the present disclosure includes a utility vehicle configured for transporting goods. The utility vehicle includes a chassis and wheels mounted to the chassis. A motor is configured to drive the wheels. A housing is mounted to the chassis. The housing is configured for storing the goods therein during transport. A handlebar extends into a chassis sleeve defined by the chassis. One of the chassis sleeve and the handlebar is oval in cross-section and the other of the chassis sleeve and the handlebar is circular in cross-section. Cooperation between the handlebar and the chassis sleeve permits horizontal movement of the handlebar forward and backward, and restricts vertical movement of the handlebar upward and downward. A strain gauge load cell sensor is configured to sense a magnitude and a direction of a force exerted on the handlebar by an operator. The strain gauge load cell sensor includes a deflection beam extending along an axial center of the handlebar. The deflection beam includes a first end and a second end opposite to the first end. The first end is mounted to the chassis and the second end is mounted to the handlebar. A control module is in communication with the strain gauge load cell sensor and the motor. The control module is configured to control motor speed and motor direction of the motor based on the magnitude and the direction of the force exerted on the handlebar by the operator as sensed by the strain gauge load cell sensor.

In other features, the deflection beam includes a first strain gauge, a second strain gauge, a third strain gauge, and a fourth strain gauge connected in a Wheatstone bridge circuit.

In other features, the handlebar includes an enabling switch configured to sense physical contact with the operator, the enabling switch is in cooperation with the control module. The control module is configured restrict operation of the motor without physical contact with the operator sensed by the enabling switch.

In other features, a velocity sensor is configured to measure velocity of the utility vehicle. The velocity sensor is in cooperation with the control module. The control module is configured to: measure acceleration of the utility vehicle based on the velocity measured by the velocity sensor; identify a loaded mass of the utility vehicle based on the measured acceleration and the magnitude of the force exerted on the handlebar as sensed by the strain gauge load cell sensor; identify a payload mass of a payload of the utility vehicle equal to a difference between the loaded mass and an unloaded mass of the utility vehicle; and generate an alert to the operator when the payload mass exceeds a predetermined threshold.

In a feature, the present disclosure includes a utility vehicle configured for transporting goods. The utility vehicle includes a chassis and wheels mounted to the chassis. A motor is configured to drive the wheels. A housing is mounted to the chassis. The housing is configured for storing the goods therein during transport. A handlebar extends into a chassis sleeve defined by the chassis. The handlebar is moveable forward and backward within the chassis sleeve. A strain gauge load cell sensor is configured to sense a magnitude and a direction of a force exerted on the handlebar by an operator. A control module is in communication with the strain gauge load cell sensor and the motor. The control module is configured to control motor speed and motor direction of the motor based on the magnitude and the direction of the force exerted on the handlebar by the operator as sensed by the strain gauge load cell sensor. A velocity sensor is configured to measure velocity of the utility vehicle. The velocity sensor is in cooperation with the control module. The control module is configured to: measure acceleration of the utility vehicle based on the velocity measured by the velocity sensor; identify a loaded mass of the utility vehicle based on the measured acceleration and the magnitude of the force exerted on the handlebar as sensed by the strain gauge load cell sensor; identify a payload mass of a payload of the utility vehicle equal to a difference between the loaded mass and an unloaded mass of the utility vehicle; and generate an alert to the operator when the payload mass exceeds a predetermined threshold.

In other features, the strain gauge load cell sensor includes a deflection beam extending along an axial center of the handlebar.

In other features, the deflection beam includes a first end and a second end opposite to the first end, the first end is mounted to the chassis and the second end is mounted to the handlebar.

In other features, the deflection beam includes a first strain gauge, a second strain gauge, a third strain gauge, and a fourth strain gauge connected in a Wheatstone bridge circuit.

In other features, the handlebar includes an enabling switch configured to sense physical contact with the operator, the enabling switch is in cooperation with the control module. The control module is configured restrict operation of the motor without physical contact with the operator sensed by the enabling switch.

In other features, one of the chassis sleeve and the handlebar is oval in cross-section and the other of the chassis sleeve and the handlebar is circular in cross-section, cooperation between the handlebar and the chassis sleeve permits horizontal movement of the handlebar forward and backward, and restricts vertical movement of the handlebar upward and downward.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
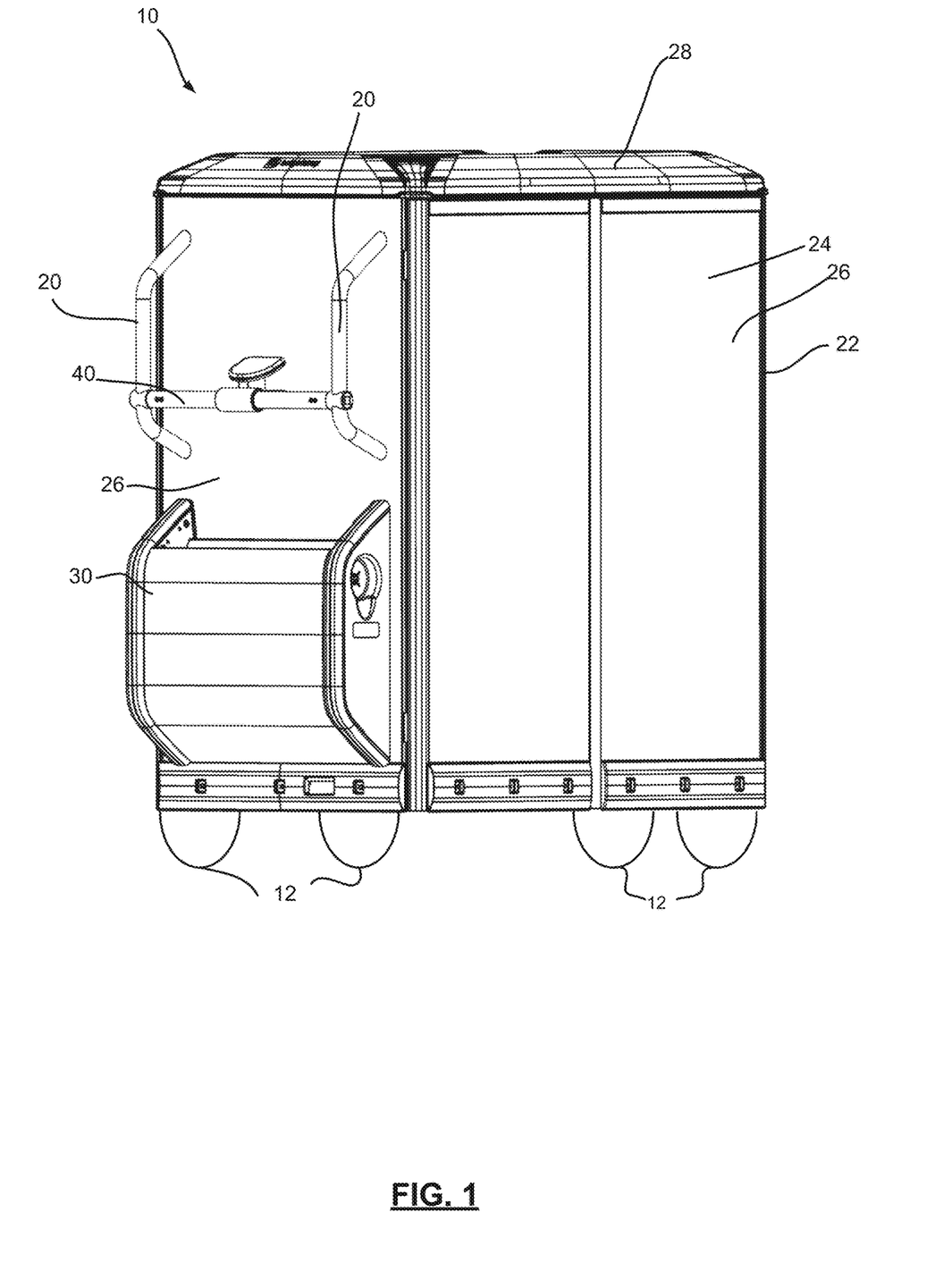
FIG. 1 illustrates an exemplary utility vehicle in accordance with the present disclosure.

FIG. 1 illustrates an exemplary utility vehicle 10 in accordance with the present disclosure. The utility vehicle 10 may be configured as a delivery cart. For example, the utility vehicle 10 may be configured as a grocery delivery cart or a shipping cart for last-mile deliveries. The utility vehicle 10 may be configured for use in any other suitable applications as well. The utility vehicle 10 is an electric vehicle, which may be driven both forward and backward with any suitable electric drive motor, such as the drive motor 160.

The utility vehicle 10 generally includes wheels 12 mounted to a chassis 20. In the example illustrated, the utility vehicle 10 further includes a frame 22 defining a housing 24. The housing 24 may be configured to house groceries, shipping containers, or any other suitable items. The housing 24 may be defined by one or more walls 26 and a cover 28. In the example illustrated, a storage bin 30 is mounted to an exterior of one of the walls 26.

Figure 2:
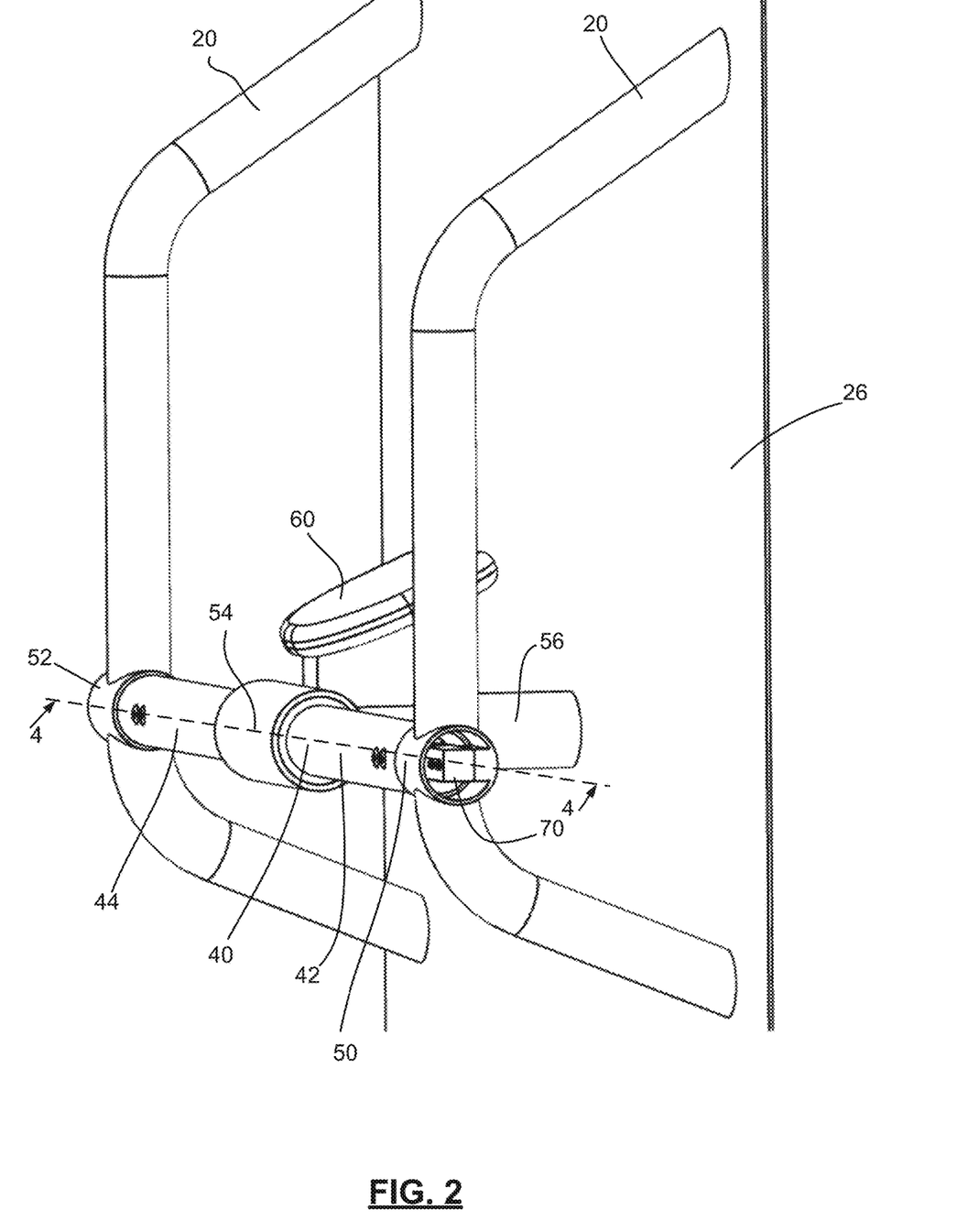
FIG. 2 is a perspective view of a handlebar of the utility vehicle of FIG. 1.
Figure 3:
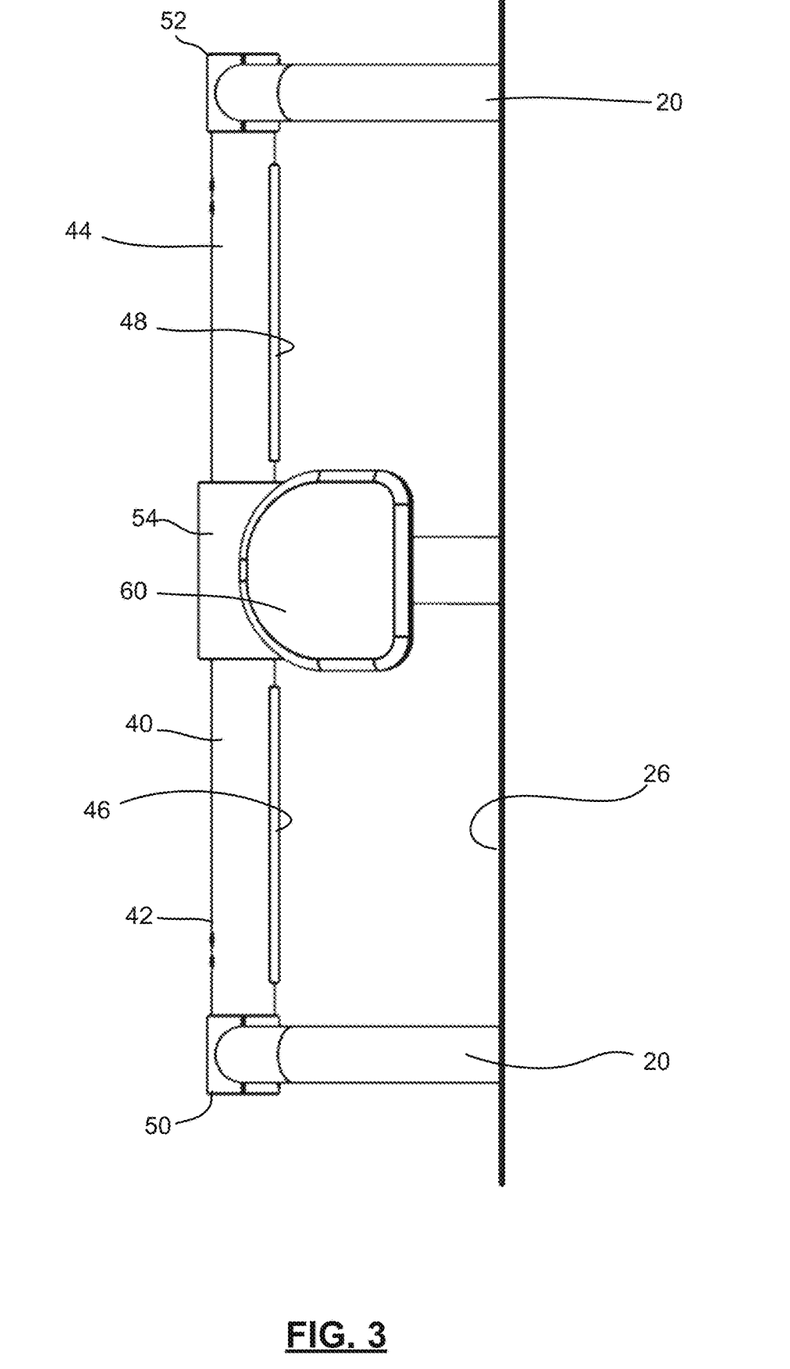
FIG. 3 is a top view of the handlebar of the utility vehicle of FIG. 1.
Figure 4:
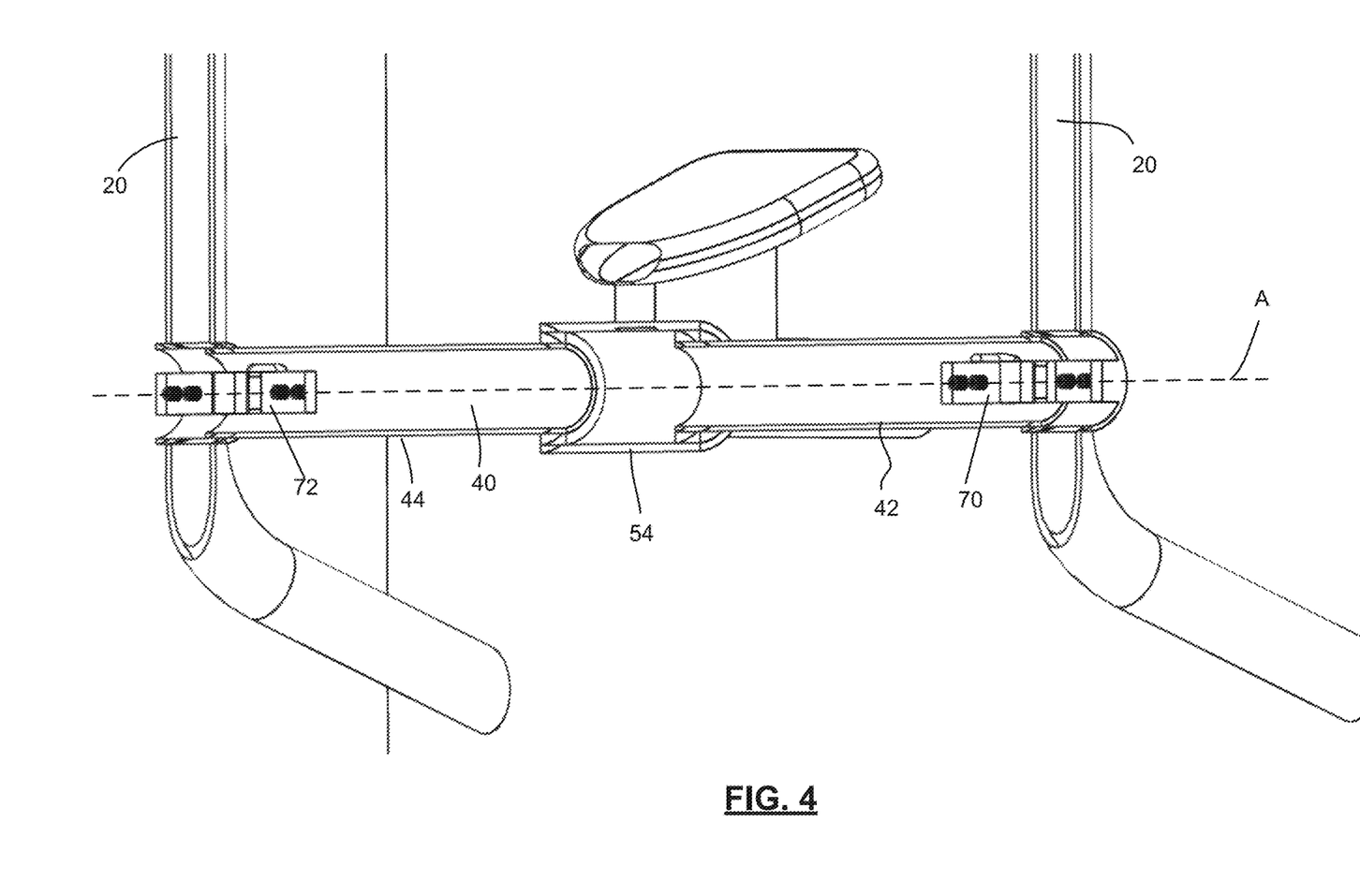
FIG. 4 is a cross-sectional view of the handlebar taken along line 4-4 of FIG. 2.

With continued reference to FIG. 1, and additional reference to FIGS. 2-4, the utility vehicle 10 further includes a handlebar 40. The handlebar 40 is mounted to the chassis 20. In the example illustrated, the handlebar 40 is mounted to an exterior portion of the chassis 20 protruding through one of the walls 26. Thus, in the example illustrated, the handlebar 40 is opposite to an outer surface of one of the walls 26. In the examples illustrated, the handlebar 40 extends horizontally. However, the handlebar 40 may be configured in other applications to extend vertically.

In the example illustrated, the handlebar 40 includes a first portion 42 and a second portion 44. The first portion 42 is seated in a first chassis sleeve 50 defined by the chassis 20. The second portion 44 of the handlebar 40 is seated in a second chassis sleeve 52 defined by the chassis 20. Between the first portion 42 and the second portion 44 is a center sleeve 54. Both the first portion 42 and the second portion 44 extend into the center sleeve 54. With particular reference to FIG. 4, there is a gap between the first portion 42 and the second portion 44 of the handlebar 40. In some applications, the handlebar 40 may be a single bar extending continuously from the first chassis sleeve 50 to the second chassis sleeve 52.

The center sleeve 54 is mounted to a support post 56. The support post 56 may be mounted to a portion of the chassis 20 within the housing 24, or to any other suitable structural member of the utility vehicle 10. Mounted to the support post 56 is a control panel 60. The control panel 60 may be mounted at any other suitable position as well. For example, the control panel 60 may be mounted to the chassis 20 or at any other suitable location. The control panel 60 includes any suitable controls for operating the utility vehicle 10. For example, the control panel 60 may include an on/off control, a brake control, a horn control, etc. The control panel 60 may also include one or more components of the control system 150 illustrated in FIG. 7. For example, the control panel 60 may include one or more of the control module 152, the amplifier 154, the filter 164, the memory module 156, and/or the motor control module 162.

Figure 7:
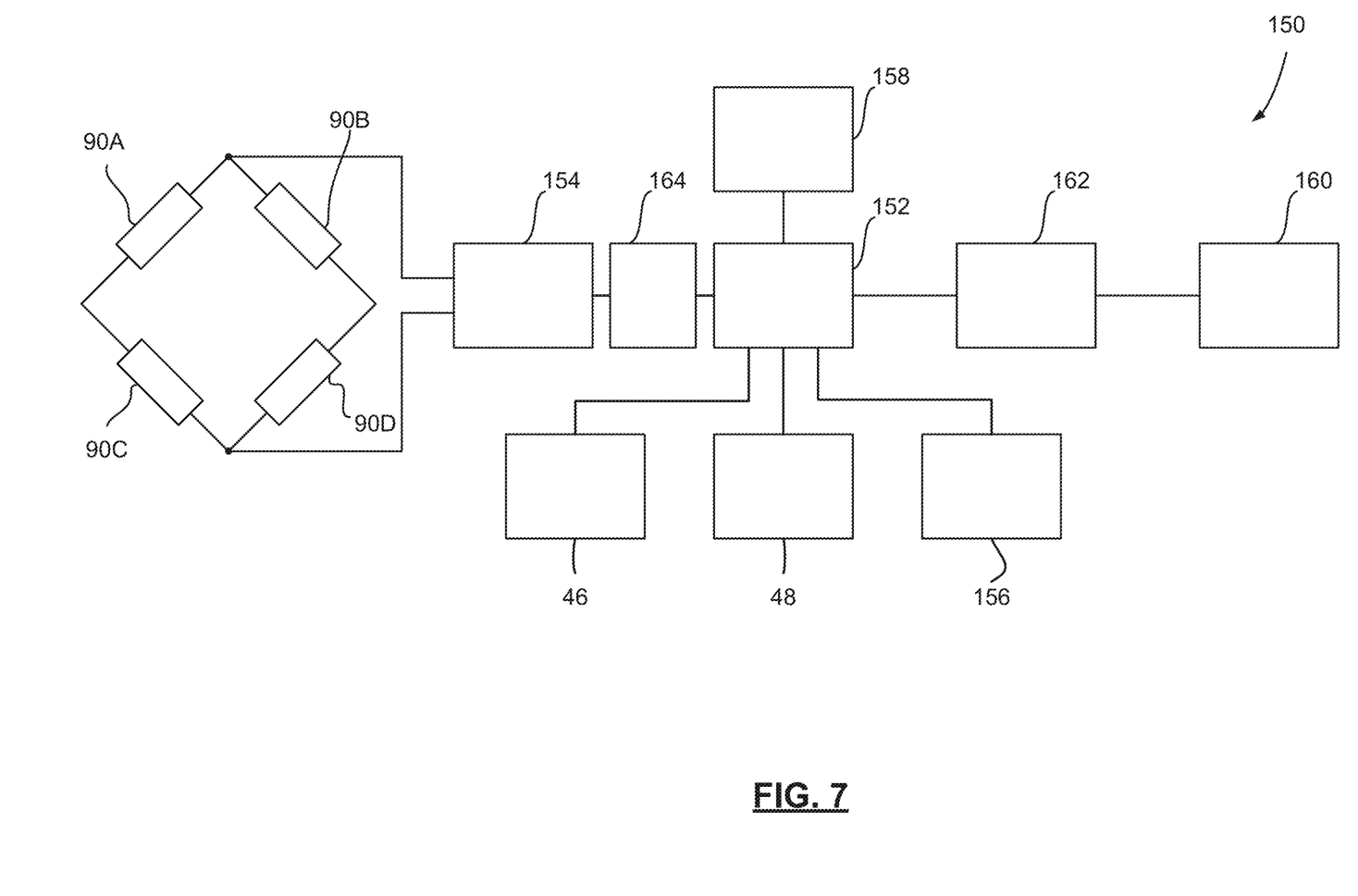
FIG. 7 illustrates an exemplary control system of the utility vehicle of FIG. 1.

The handlebar 40 further includes one or more enabling sensors or switches, such as a first enabling switch 46 and a second enabling switch 48, as illustrated in FIGS. 3 and 7. The first and second enabling switches 46, 48 may be any suitable switches or sensors configured to identify when at least one of the first and second enabling switches 46, 48 is physically contacted by the operator, such as when the operator has his or her hand on one of the enabling switches 46, 48. The enabling switches 46, 48 may be, for example, any suitable resistive, capacitive, or piezo switch. The first and second enabling switching 46, 48 may be located on an inner surface of the handlebar 40, or at any other suitable location on the handlebar 40. As explained herein, the utility vehicle 10 is configured to not move unless at least one of the enabling switches 46, 48 is contacted by an operator.

The utility vehicle 10 further includes at least one sensor configured to sense a magnitude and a direction of force exerted on the handlebar 40 by an operator. For example, and with particular reference to FIGS. 4-6, the utility vehicle 10 may include a first sensor 70 and a second sensor 72. The first sensor 70 is seated within the first portion 42 of the handlebar 40 and mounted to both the first portion 42 and to an inner surface of the first chassis sleeve 50. The second sensor 72 is seated within the second portion 44 of the handlebar 40. The second sensor 72 is mounted to an inner surface of the second portion 44 of the handlebar 40, and an inner surface of the second chassis sleeve 52. Additional details of the manner in which the first and second sensors 70, 72 are mounted is set forth herein.

Figure 5:
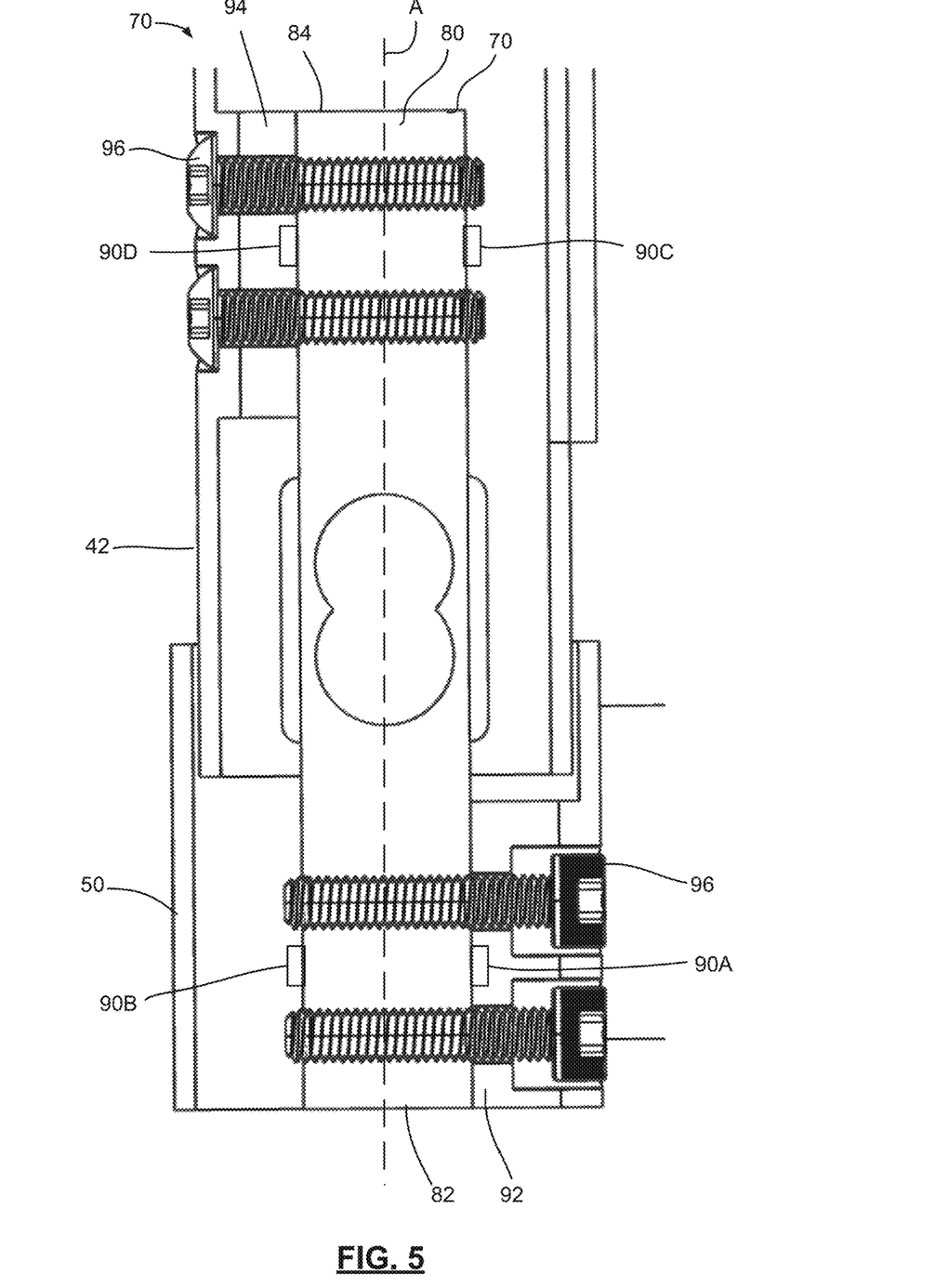
FIG. 5 illustrates an exemplary sensor in accordance with the present disclosure arranged between the handlebar and a chassis of the utility vehicle of FIG. 1.

The first and second sensors 70, 72 may be any sensors suitable for sensing a magnitude and a direction of a force exerted on the handlebar 40 by the operator. For example, each of the first sensor 70 and the second sensor 72 may be strain gauge load cell sensors. With particular reference to FIG. 5, additional details of the first sensor 70 will now be described. The first sensor 70 is substantially similar to, or identical to, the second sensor 72. Thus, the detailed description of the first sensor 70 also applies to the second sensor 72.

The first sensor 70 includes a deflection beam 80. The deflection beam 80 is seated on a longitudinal axis A of the handlebar 40, which extends along an axial center of each of the first portion 42 and the second portion 44 of the handlebar 40. The second sensor 72 is likewise arranged along the longitudinal axis A.

The deflection beam 80 includes a first end 82, which is opposite to a second end 84. The deflection beam 80 includes a plurality of strain gauges, or any other suitable gauges/sensors configured to measure bending of the deflection beam 80. Specifically, at the first end 82, the deflection beam 80 includes a first strain gauge 90A and a second strain gauge 90B, which are on opposite sides of the deflection beam 80. At the second end 84, the deflection beam 80 includes a third strain gauge 90C and a fourth strain gauge 90D, which are on opposite sides of the deflection beam 80. As illustrated in FIG. 7, the first, second, third, and fourth strain gauges 90A, 90B, 90C, and 90D are connected in a Wheatstone bridge circuit, which compensates for temperature fluctuations. Although four strain gauges 90A, 90B, 90C, and 90D are illustrated, the deflection beam 80 may be configured with only one strain gauge 90A or 90B at the first end 82, and only one strain gauge 90C or 90D at the second end 84.

Figure 6:
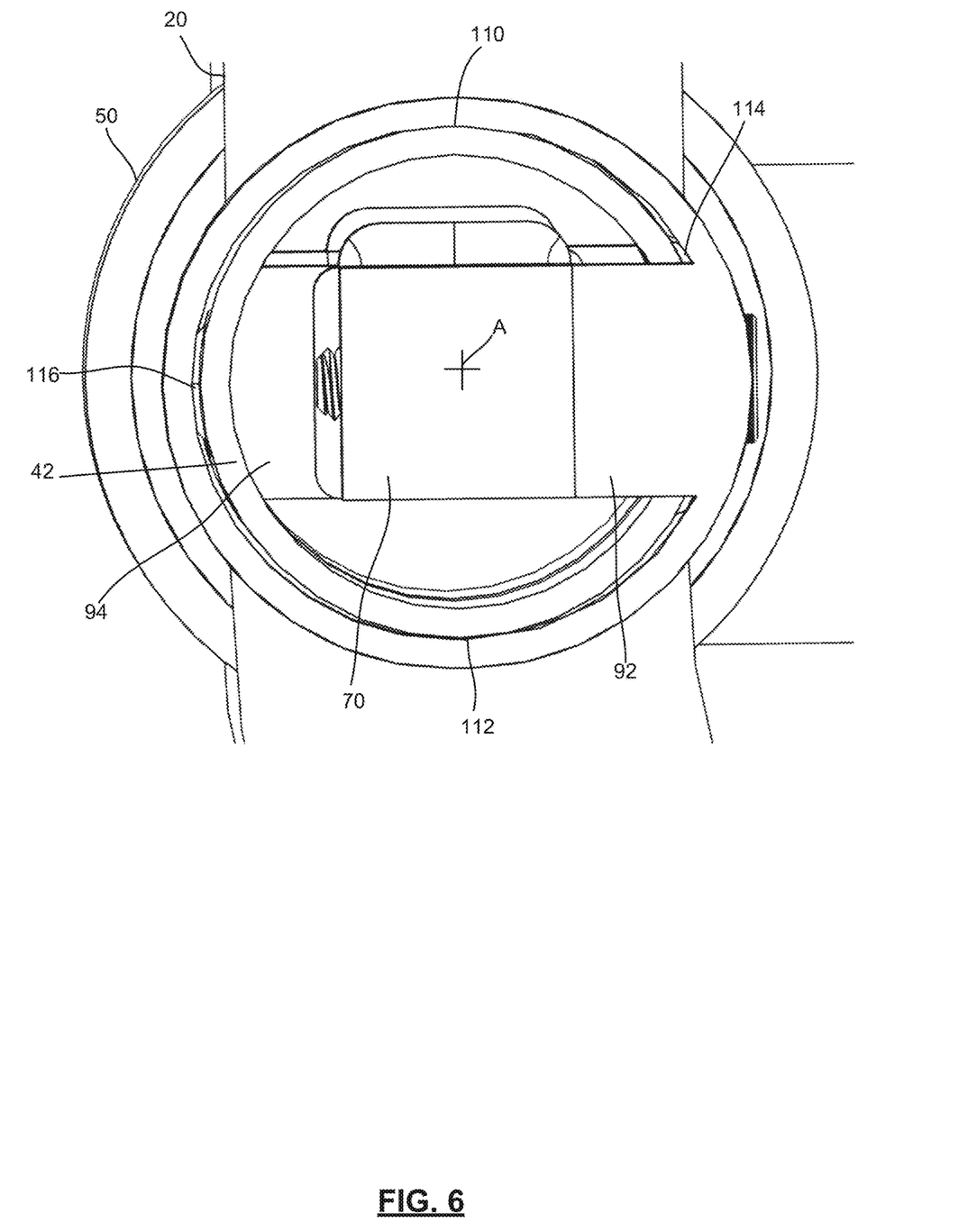
FIG. 6 is a side view of an interface between the handlebar and the chassis.

With particular reference to FIGS. 5 and 6, at the first end 82, the deflection beam 80 is mounted to a chassis standoff mount 92 within the first chassis sleeve 50. At the second end 84, the deflection beam 80 is mounted to a handlebar standoff mount 94 within the first portion 42 of the handlebar 40. The deflection beam 80 is secured in place with any suitable fasteners, such as the fasteners 96. The mounts 92 and 94 effectively act as stops, which prevent the deflection beam 80 from overbending.

FIG. 6 illustrates the interface between the first portion 42 of the handlebar 40 and the first chassis sleeve 50 in greater detail. The interface between the second portion 44 of the handlebar 40 and the second chassis sleeve 52 is substantially similar to, or the same as, the configuration of FIG. 6. In the example of FIG. 6, the first portion 42 of the handlebar 40 is round in cross-section, and the first chassis sleeve 50 is oval in cross-section. In other applications, this configuration may be reversed such that the first chassis sleeve 50 is round in cross-section and the handlebar 40 is oval in cross-section. The first portion 42 of the handlebar 40 directly abuts the first chassis sleeve 50 at an upper contact point 110 and a lower contact point 112 to restrict vertical movement of the handlebar 40 upward and downward.

A front gap 114 is defined between the handlebar 40 and the first chassis sleeve 50 at a front of the interface. A rear gap 116 is defined between the handlebar 40 and the first chassis sleeve 50 at a rear of the interface. The front gap 114 and the rear gap 116 permit horizontal movement of the handlebar 40 forward and backward. Thus, when the first portion 42 of the handlebar 40 is pushed inward toward the wall 26, the first portion 42 of the handlebar 40 moves horizontally inward into the front gap 114, which causes the deflection beam 80 to bend inward. Conversely, when the first portion 42 of the handlebar 40 is pulled outward away from the wall 26, the handlebar 40 moves into the rear gap 116, which causes the deflection beam 80 to bend outward. This bending of the deflection beam 80 is sensed by the strain gauges 90A, 90B, 90D, and 90C, which are connected to the control module 152 by way of the amplifier 154, as illustrated in FIG. 7. The second sensor 72 moves in the same manner when the second portion 44 is pushed and pulled, and strain gauges of the second sensor 72 are also connected to the control module 152 by way of an amplifier.

The control system 150 of FIG. 7 will now be described in additional detail. The control module 152 is connected to the first enabling switch 46 and the second enabling switch 48. Based on inputs from the first and second enabling switches 46 and 48, the control module 152 is configured to determine whether or not an operator is in physical contact with the first or second portions 42, 44 of the handlebar 40.

The control module 152 is also connected to an amplifier 154, which is connected to the Wheatstone bridge circuit including the strain gauge sensors 90A, 90B, 90C, and 90D. A filter 164 is between the amplifier 154 and the control module 152. Based on inputs from the strain gauge sensors 90A, 90B, 90C, and 90D, the control module 152 is configured to identify a magnitude and a direction of force exerted on the first portion 42 of the handlebar 40 by the operator. The control module 152 similarly receives inputs from the strain gauges of the second sensor 72, based on which the control module 152 is configured to identify the magnitude and direction of force exerted on the second portion 44 of the handlebar 40. The control module 152 is configured to take inputs from the strain gauge sensors 90A, 90B, 90C by way of the amplifier 154, but the control module 152 will also perform some signal processing or reconditioning prior to identifying a magnitude and direction. This reconditioning is to eliminate any possible noise from the sensors 90A, 90B, 90C.

The control module 152 is also in communication with the memory module 156. The memory module 156 is configured to store data for use during operation of the utility vehicle 10, such as, but not limited to, calibration data, and a table correlating force exerted on the handlebar 40 with a target speed of the utility vehicle 10. For example, the memory module 156 may include a table according to which the speed of the vehicle will increase proportionately in accordance with the amount of force applied when the exerted force is greater than 10 Nm. At or above 40 Nm, the maximum speed may be 5 km/h, for example.

For example, an exemplary force-speed lookup table may call for a vehicle speed of 0 km/h when force exerted on the handlebar 40 is 10 Nm or less in either the forward or backward direction. The table may call for a maximum speed of 5 km/h when the force exerted on the handlebar 40 is 40 Nm either forward or backwards. When the total force exerted on the handlebar 40 is between 10 Nm and 40 Nm, the table may call for a speed that is proportionate to the force exerted on the handlebar 40.

The control module 152 receives inputs from the velocity sensor 158 indicating the velocity of the utility vehicle 10. Based on the velocity of the utility vehicle 10, the control module 152 is configured to identify a payload weight of the utility vehicle 10. Specifically, the control module 152 is configured to measure acceleration of the utility vehicle 10 based on the velocity measured by the velocity sensor 158 according to the following equation, for example: acceleration=(final velocity−initial velocity)/time. Based on the measured acceleration and the magnitude of force exerted on the handlebar 40 as measured by the first and second sensors 70, 72, the control module 152 is configured to determine an overall loaded mass of the utility vehicle 10 based on the following equation, for example: Force=Mass*Acceleration (F=M×A). Knowing the overall loaded mass, the control module 152 is configured to identify a payload mass of a payload of the utility vehicle 10 as being equal to a difference between the calculated overall loaded mass and a known unloaded mass of the utility vehicle. The unloaded mass of the utility vehicle 10 is determined by, for example, the manufacturer, and saved in the memory module 156. When the payload mass exceeds a predetermined threshold, such as 200 lbs., for example, the control module 152 is configured to generate an alert to the operator. The alert may be any suitable audio or visual alert generated at the vehicle 10, or the alert may come from an offboard location such as a smart phone application or wearable device that will receive a push notification with audio and/or haptic feedback. The predetermined threshold may be any suitable threshold and is saved in the memory module 156. The predetermined threshold may be set by a manufacturer or operator using the control panel 60, or any other suitable input device.

Based on the lookup table saved in the memory module 156, the control module 152 sets the speed of the utility vehicle 10. Specifically, the control module 152 inputs the desired speed and direction to the motor control module 162. The motor control module 162 is configured to control the drive motor 160 to set the direction of the drive motor 160 based on the direction that the operator moves the handlebar 40. Further, the motor control module 162 is configured to set the speed of the drive motor 160 in accordance with the lookup table saved in the memory module 156 so that the speed corresponds to the magnitude of force exerted on the handlebar 40. Therefore, the speed and direction of the drive motor 160 corresponds to the magnitude and the direction of the force exerted on the handlebar by the operator as measured by the first sensor 70 and the second sensor 72.

Figure 8:
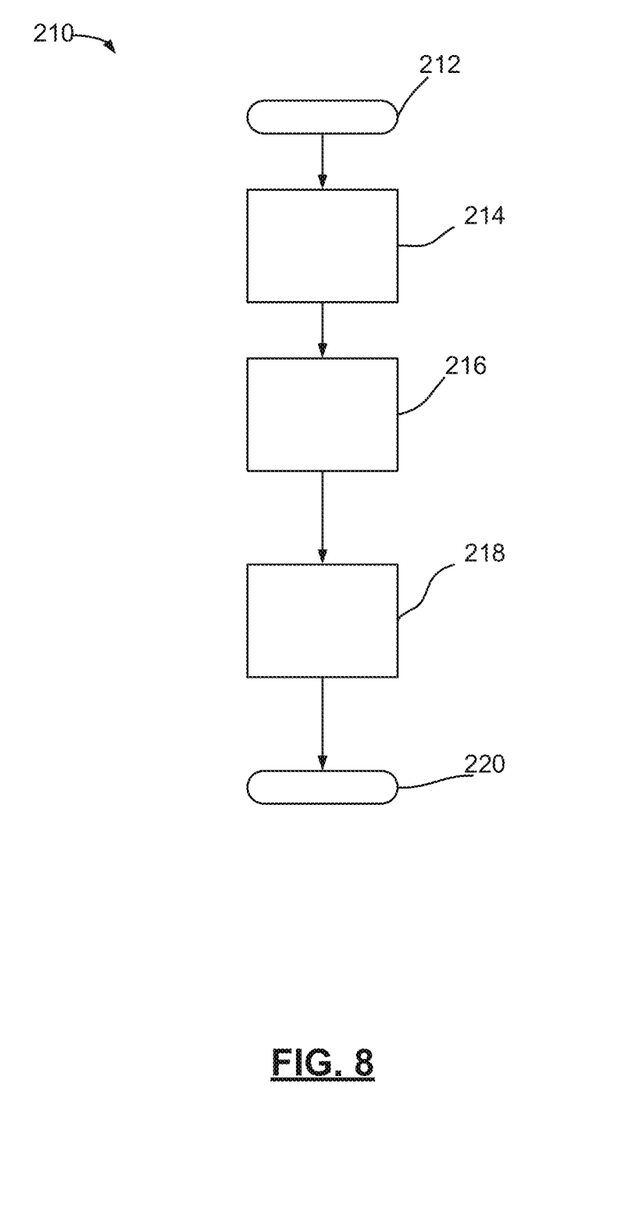
FIG. 8 illustrates an exemplary calibration method in accordance with the present disclosure for calibrating the utility vehicle of FIG. 1.

FIG. 8 illustrates an exemplary calibration method 210 for the utility vehicle 10, or any other suitable utility vehicle 10. The method 210 may be performed at the manufacturer of the utility vehicle 10, or at any other suitable origin point of the utility vehicle 10. The calibration method 210 may be performed by the control module 152, or any other suitable control module at the manufacturer or other suitable point of origin for the utility vehicle 10.

The method 210 starts at block 212, and at block 214 the control module 152 calibrates the zero offset of the first sensor 70 and the second sensor 72. The output of the first sensor 70 and the second sensor 72 when their respective deflection beams 80 are experiencing no force is referred to as the "zero offset." From block 214, the method 210 proceeds to block 216. At block 216, the control module 152 determines acceptable upper and lower threshold offset values based on the zero offset value identified at block 214. For example, if the zero offset value from block 214 is −5, an exemplary upper threshold offset value may be 0 and an exemplary lower threshold offset value may be −10. Thus, in other words, at block 216 the control module 152 identifies an acceptable zero offset range based on the "zero offset" calculated at block 214. At block 218, the control module 152 saves the values from blocks 214 and 216 in the memory module 156. From block 218, the calibration method 210 proceeds to block 220, where the calibration method 210 ends.

Figure 9:
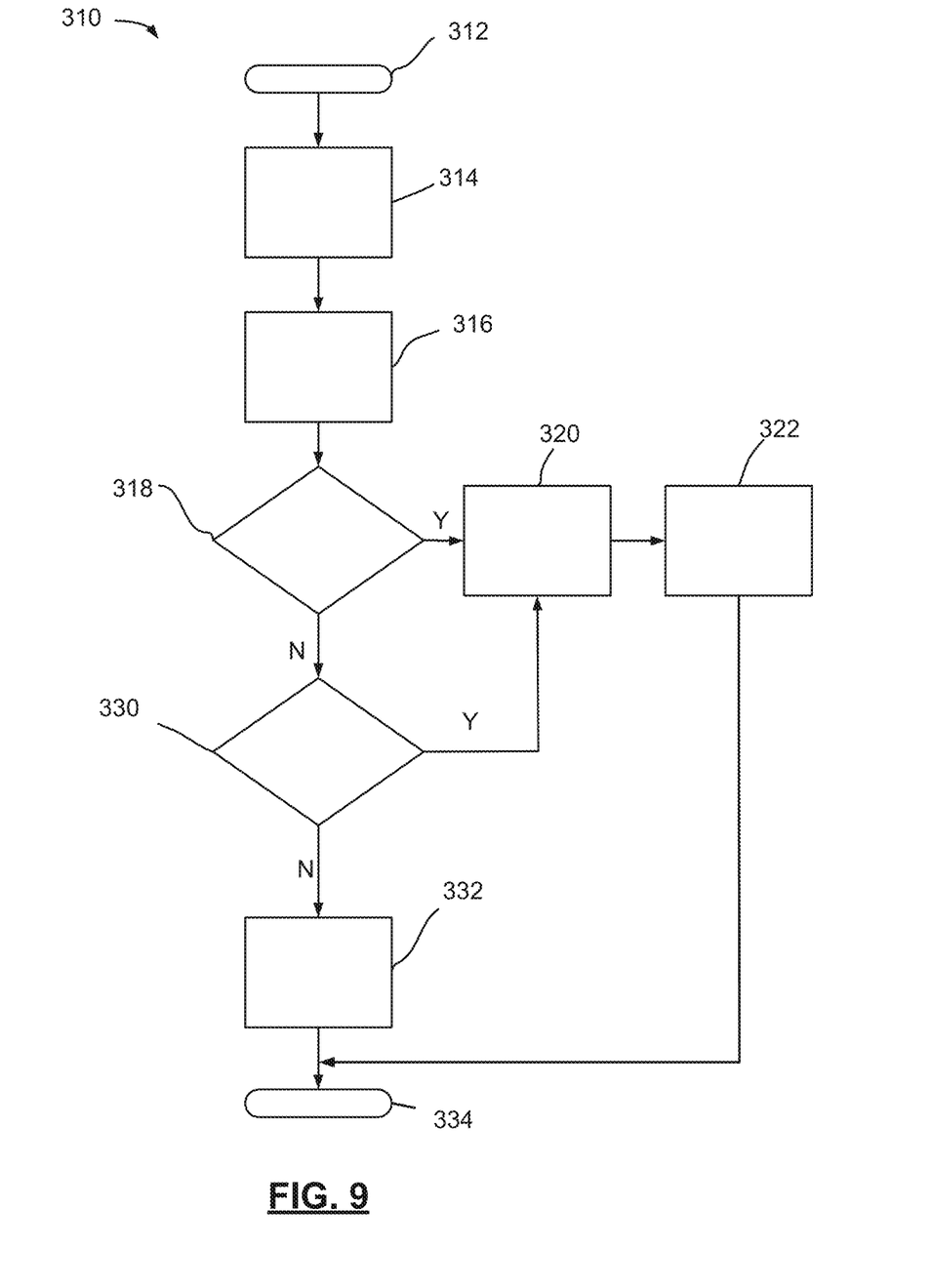
FIG. 9 illustrates an exemplary start-up method in accordance with the present disclosure for the utility vehicle of FIG. 1.

FIG. 9 illustrates an exemplary start-up method 310 for the utility vehicle 10, or any other suitable utility vehicle. The startup method 310 is performed subsequent to the initial calibration method 210. The method 310 may be performed by the control system 150, or any other suitable control system. The method 310 starts at block 312 and proceeds to block 314 when the utility vehicle 10 is powered on, such as by an end user. From block 314, the method 310 proceeds to block 316 where the control module 152 calculates the zero offset of the first sensor 70 and the second sensor 72 at start-up. From block 316, the method 310 proceeds to block 318.

At block 318, the control module 152 determines whether the zero offset value calculated at block 316 is greater than the upper offset value threshold determined at block 216 of the method 210. If the offset calculated at 316 is greater than the upper threshold, then the method 310 proceeds to block 320 and block 322. At block 320, the control module 152 is configured to generate an error message, and at block 322 the control module 152 is configured to disable the motor control module 162, which disables the drive motor 160. Based on the error message generated at block 320, the operator of the utility vehicle 10 is informed that the first and/or second sensors 70, 72 are in need of examination.

If at block 318 the control module 152 determines that the zero offset value calculated at block 316 is not greater than the upper offset value threshold determined at block 216 of the method 210, then the method 310 proceeds from block 318 to block 330. At block 330, the control module 152 determines whether the offset calculated at block 316 is below the lower offset threshold determined at block 216 of the method 210. If at block 330 the offset calculated at 316 is lower than the lower offset value threshold, then the method 310 proceeds to blocks 320 and 322.

If at block 330 the control module 152 determines that the offset from block 316 is not less than the lower offset threshold from block 216, then the method 310 proceeds to block 332. At block 332, the control module 152 initializes the control system 150 with a new zero offset, which is the zero offset calculated at block 316. For example, if at block 316 the zero offset is calculated to be −7, −7 is used as the new zero offset because −7 is within the acceptable exemplary range of −10 to 0 determined at block 216. After the control system 150 is initialized with the new zero offset at block 332, the method 310 ends at block 334.

Figure 10:
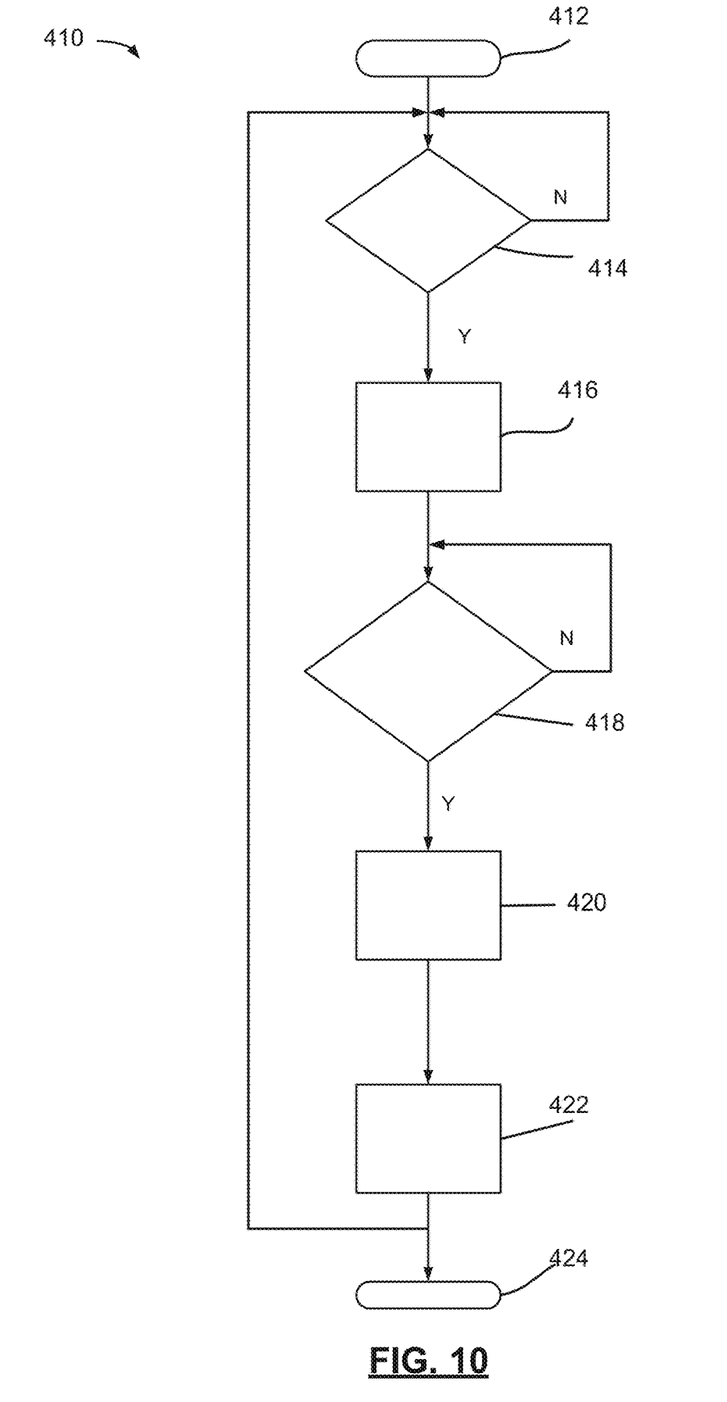
FIG. 10 illustrates an exemplary method of operating the utility vehicle of FIG. 1.

FIG. 10 illustrates an exemplary method of operation 410 for the utility vehicle 10, or any other suitable utility vehicle. The method 410 is performed by the control system 150, or any other suitable control system. The method 410 starts at block 412 after the start up method 310 has been performed. At block 414, the control module 152 determines whether or not the operator of the vehicle 10 is depressing, or otherwise making physical contact with, at least one of the first and second enabling switches 46, 48 based on inputs to the control module 152. If at block 414 the control module 152 determines that neither the first enabling switch 46 nor the second enabling switch 48 has been depressed (or is otherwise physically contacted by the operator), then the control module 152 continues to monitor the first and second enabling switches 46, 48 for contact with the operator. When one or both of the first and second enabling switches 46, 48 is physically contacted by the operator, the method 410 proceeds from block 414 to block 416.

At block 416, the control module 152 detects the magnitude and direction of force applied to the handlebar 40 by the operator based on inputs from the first and second sensors 70, 72. At block 418, the control module 152 determines whether the degree of force applied to the handlebar 40 is above a minimum threshold. Any suitable minimum threshold may be used and stored at the memory module 156, such as 10 Nm. If at block 418 the degree of force is not above the minimum threshold, then the control module 152 continues to monitor the degree of force until it is above the minimum threshold.

When the degree of force exerted on the handlebar 40 is above the minimum threshold, the method 410 proceeds to block 420. At block 420, the control module 152 identifies a target speed of the utility vehicle 10 corresponding to the force applied to the handlebar 40, and whether the force is applied in the forward or backward direction. The target speed may be saved at the memory module 156, or at any other suitable location. If the force exerted is 40 Nm or more, the target speed may be 5 km/h, for example. If the force applied is 25 Nm, then the vehicle target speed may be 2.5 km/h, for example. If the force applied is 10 Nm or less, then the target speed may be set to 0 km/h. Between 10 Nm and 40 Nm, the target speed may be set to be proportional to the force applied between 0.01 km/h and 5 km/h.

Once the control module 152 identifies the target speed, the method 410 proceeds to block 422, where the control module 152 inputs the target speed and direction to the motor control module 162. The motor control module 162 sets the drive motor 160 direction and the speed to the target speed. From block 422, the method 410 returns to block 414 and is repeatedly run to correlate the speed and direction of the drive motor 160 with the direction and amount of force applied to the handlebar 40. The method 410 ends at block 424 when the vehicle 10 is powered off.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A utility vehicle configured for transporting goods, the utility vehicle comprising:
   a chassis;
   wheels mounted to the chassis;
   a housing mounted to the chassis, the housing configured for storing the goods therein during transport;
   a motor configured to drive the wheels;
   a handlebar extending into a chassis sleeve defined by the chassis, the handlebar slidably moveable forward and backward within the chassis sleeve;
   a sensor including a flexible member having a first end mounted to the chassis sleeve and a second end mounted to the handlebar, the sensor configured to sense a magnitude and a direction of a force exerted on the handlebar by an operator; and
   a control module in communication with the sensor and the motor, the control module configured to control motor speed and motor direction of the motor based on the magnitude and the direction of the force exerted on the handlebar by the operator as sensed by the sensor,
   wherein the flexible member is a deflection beam extending along an axial center of the handlebar.

2. The utility vehicle of claim 1, wherein the first end of the flexible member is fastened to a chassis stand-off mount within the chassis sleeve, and the second end of the flexible member is fastened to a handlebar standoff mount within the handlebar.

3. The utility vehicle of claim 1, wherein the flexible member includes a first strain gauge proximate to the first end and a second strain gauge proximate to the second end.

4. The utility vehicle of claim 3, wherein:
   the flexible member further includes a third strain gauge proximate to the first end and a fourth strain gauge proximate to the second end; and
   the first strain gauge, the second strain gauge, the third strain gauge, and the fourth strain gauge are connected in a Wheatstone bridge circuit.

5. The utility vehicle of claim 1, wherein at an interface between the handlebar and the chassis sleeve, one of the chassis sleeve and the handlebar is oval in cross-section, and the other of the chassis sleeve and the handlebar is circular in cross-section.

6. The utility vehicle of claim 5, wherein cooperation between the handlebar and the chassis sleeve at the interface permits horizontal movement of the handlebar forward and backward, and restricts vertical movement of the handlebar upward and downward relative to the chassis sleeve.

7. The utility vehicle of claim 5, wherein:
at the interface between the handlebar and the chassis sleeve, the handlebar is round in cross-section and the chassis sleeve is oval in cross-section;
the handlebar directly abuts the chassis sleeve at a top and a bottom of the interface to restrict vertical movement of the handlebar upward and downward; and
a front gap is defined between the handlebar and the chassis sleeve at a front of the interface, and a rear gap is defined between the handlebar and the chassis sleeve at a rear of the interface, to permit horizontal movement of the handlebar forward and backward.

8. The utility vehicle of claim 1, wherein:
the handlebar includes an enabling switch configured to sense physical contact with the operator, the enabling switch is in cooperation with the control module; and
the control module is configured restrict operation of the motor without physical contact with the operator sensed by the enabling switch.

9. The utility vehicle of claim 1, further comprising a velocity sensor configured to measure velocity of the utility vehicle, the velocity sensor is in cooperation with the control module;
wherein the control module is configured to:
measure acceleration of the utility vehicle based on the velocity measured by the velocity sensor;
identify a loaded mass of the utility vehicle based on the measured acceleration and the magnitude of the force exerted on the handlebar as sensed by the sensor;
identify a payload mass of a payload of the utility vehicle equal to a difference between the loaded mass and an unloaded mass of the utility vehicle; and
generate an alert to the operator when the payload mass exceeds a predetermined threshold.

10. A utility vehicle configured for transporting goods, the utility vehicle comprising:
a chassis;
wheels mounted to the chassis;
a motor configured to drive the wheels;
a housing mounted to the chassis, the housing configured for storing the goods therein during transport;
a handlebar extending into a chassis sleeve defined by the chassis, one of the chassis sleeve and the handlebar is oval in cross-section and the other of the chassis sleeve and the handlebar is circular in cross-section, cooperation between the handlebar and the chassis sleeve permits horizontal movement of the handlebar forward and backward, and restricts vertical movement of the handlebar upward and downward;
a strain gauge load cell sensor configured to sense a magnitude and a direction of a force exerted on the handlebar by an operator, the strain gauge load cell sensor including a deflection beam extending along an axial center of the handlebar, the deflection beam including a first end and a second end opposite to the first end, the first end is mounted to the chassis and the second end is mounted to the handlebar; and
a control module in communication with the strain gauge load cell sensor and the motor, the control module configured to control motor speed and motor direction of the motor based on the magnitude and the direction of the force exerted on the handlebar by the operator as sensed by the strain gauge load cell sensor.

11. The utility vehicle of claim 10, wherein the deflection beam includes a first strain gauge, a second strain gauge, a third strain gauge, and a fourth strain gauge connected in a Wheatstone bridge circuit.

12. The utility vehicle of claim 10, wherein:
the handlebar includes an enabling switch configured to sense physical contact with the operator, the enabling switch is in cooperation with the control module; and
the control module is configured restrict operation of the motor without physical contact with the operator sensed by the enabling switch.

13. The utility vehicle of claim 10, further comprising a velocity sensor configured to measure velocity of the utility vehicle, the velocity sensor is in cooperation with the control module;
wherein the control module is configured to:
measure acceleration of the utility vehicle based on the velocity measured by the velocity sensor;
identify a loaded mass of the utility vehicle based on the measured acceleration and the magnitude of the force exerted on the handlebar as sensed by the strain gauge load cell sensor;
identify a payload mass of a payload of the utility vehicle equal to a difference between the loaded mass and an unloaded mass of the utility vehicle; and
generate an alert to the operator when the payload mass exceeds a predetermined threshold.

14. A utility vehicle configured for transporting goods, the utility vehicle comprising:
a chassis;
wheels mounted to the chassis;
a motor configured to drive the wheels;
a housing mounted to the chassis, the housing configured for storing the goods therein during transport;
a handlebar extending into a chassis sleeve defined by the chassis, the handlebar is moveable forward and backward within the chassis sleeve;
a strain gauge load cell sensor configured to sense a magnitude and a direction of a force exerted on the handlebar by an operator;
a control module in communication with the strain gauge load cell sensor and the motor, the control module configured to control motor speed and motor direction of the motor based on the magnitude and the direction of the force exerted on the handlebar by the operator as sensed by the strain gauge load cell sensor; and
a velocity sensor configured to measure velocity of the utility vehicle, the velocity sensor is in cooperation with the control module;
wherein the control module is configured to:
measure acceleration of the utility vehicle based on the velocity measured by the velocity sensor;
identify a loaded mass of the utility vehicle based on the measured acceleration and the magnitude of the force exerted on the handlebar as sensed by the strain gauge load cell sensor;
identify a payload mass of a payload of the utility vehicle equal to a difference between the loaded mass and an unloaded mass of the utility vehicle; and
generate an alert to the operator when the payload mass exceeds a predetermined threshold.

15. The utility vehicle of claim 14, wherein the strain gauge load cell sensor includes a deflection beam extending along an axial center of the handlebar.

16. The utility vehicle of claim 15, wherein the deflection beam includes a first end and a second end opposite to the first end, the first end is mounted to the chassis and the second end is mounted to the handlebar.

17. The utility vehicle of claim 16, wherein the deflection beam includes a first strain gauge, a second strain gauge, a third strain gauge, and a fourth strain gauge connected in a Wheatstone bridge circuit.

18. The utility vehicle of claim 14, wherein:
the handlebar includes an enabling switch configured to sense physical contact with the operator, the enabling switch is in cooperation with the control module; and
the control module is configured restrict operation of the motor without physical contact with the operator sensed by the enabling switch.

19. The utility vehicle of claim 14, wherein one of the chassis sleeve and the handlebar is oval in cross-section and the other of the chassis sleeve and the handlebar is circular in cross-section, cooperation between the handlebar and the chassis sleeve permits horizontal movement of the handlebar forward and backward, and restricts vertical movement of the handlebar upward and downward.

* * * * *